US008548304B2

(12) United States Patent
Song et al.

(10) Patent No.: US 8,548,304 B2
(45) Date of Patent: Oct. 1, 2013

(54) APPARATUS AND METHOD FOR DISPLAYING AVAILABLE VIDEO PLAY TIMES BASED ON REMAINING BATTERY CAPACITY

(75) Inventors: Kwan Woong Song, Seongnam-si (KR); Young Hun Joo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 553 days.

(21) Appl. No.: 12/626,753

(22) Filed: Nov. 27, 2009

(65) Prior Publication Data

US 2010/0135642 A1 Jun. 3, 2010

(30) Foreign Application Priority Data

Nov. 28, 2008 (KR) ........................ 10-2008-0120163

(51) Int. Cl.
*H04N 5/917* (2006.01)
(52) U.S. Cl.
USPC ........................................ 386/328; 386/331
(58) Field of Classification Search
USPC ................................................ 386/328, 331
See application file for complete search history.

(56) References Cited

U.S. PATENT DOCUMENTS

| 7,450,820 | B2* | 11/2008 | Uenaka et al. | 386/239 |
| 2004/0052275 | A1* | 3/2004 | Murakami et al. | 370/503 |
| 2007/0183755 | A1* | 8/2007 | Mae | 386/112 |
| 2008/0253251 | A1* | 10/2008 | Miyashita et al. | 369/53.22 |
| 2009/0116814 | A1* | 5/2009 | Morohashi et al. | 386/65 |
| 2009/0232480 | A1* | 9/2009 | Jendbro | 386/117 |
| 2009/0322962 | A1* | 12/2009 | Weeks | 348/726 |
| 2010/0281042 | A1* | 11/2010 | Windes et al. | 707/756 |

\* cited by examiner

*Primary Examiner* — Thai Tran
*Assistant Examiner* — Jose Mesa
(74) *Attorney, Agent, or Firm* — Sughrue Mion, PLLC

(57) ABSTRACT

A apparatus and method for displaying available video play times are provided. Information about a remaining battery capacity of a video playing apparatus and information about a resolution of a video file is received from a first signal input unit, and information contained in a codec-resolution mapping table is received from a second signal input unit. Available video play times associated with video decoding modes are acquired based on the information received from the first signal input unit and the information received from the second signal input unit.

13 Claims, 3 Drawing Sheets

| codec \ resolution | VGA | QVGA |
|---|---|---|
| H.264 | 20m | 50m |
| MPEG-4 | 50m | 1h40m |
| DivX | 40m | |

| ORIGINAL VIDEO INFORMATION | VIDEO TITLE | THE WAR | | |
|---|---|---|---|---|
| | RESOLUTION | VGA | | |
| | TOTAL PLAY TIME | 1 HOUR 20 MIN | | |
| DESIRED PLAY TIME | VGA | HIGH RESOLUTION | 30 MIN | ▶ |
| | | LOW RESOLUTION | 40 MIN | ▶ |
| | QVGA | HIGH RESOLUTION | 1 HOUR | ▶ |
| | | LOW RESOLUTION | 1 HOUR 20 MIN | ▶ |

FIG.3

APPARATUS AND METHOD FOR DISPLAYING AVAILABLE VIDEO PLAY TIMES BASED ON REMAINING BATTERY CAPACITY

CROSS REFERENCE TO RELATED APPLICATION

This application claims the priority under 35 U.S.C. §119(a) from Korean Patent Application No. 10-2008-0120163, filed in the Korean Intellectual Property Office on Nov. 28, 2008, the entire disclosure of which is hereby incorporated by reference.

BACKGROUND

1. Field

Apparatuses and methods consistent with exemplary embodiments relate to an apparatus capable of playing videos using a battery and a method of playing videos, and more particularly, to an apparatus and method for displaying available play times of a video taking a remaining battery capacity into account.

2. Description of the Related Art

In general, a portable terminal supporting a multimedia function can play videos according to standard resolutions, and available play times of the videos depend on a remaining battery capacity of the portable terminal. For this reason, when playing a video on a portable terminal supporting a multimedia function, the user may not be able to fully view the video for a desired time due to shortage of the battery capacity.

For example, if a play time of the video the user desires to view is two hours long but the portable terminal has a remaining battery capacity capable of playing the video for about one hour, then the user is unable to view the entire two-hour video.

SUMMARY

The present invention provides an apparatus and method for displaying available play times associated with resolutions based on a remaining capacity of a battery in an apparatus capable of playing videos.

The present invention also provides an apparatus and method for displaying available video play times associated with resolutions based on a remaining battery capacity in a multimedia apparatus that depends on battery power.

Further, the present invention provides an apparatus and method for improving user convenience by allowing a user of a multimedia apparatus to select an available play time of a video depending on a remaining capacity of a battery.

According an aspect of an exemplary embodiment, there is provided an apparatus for displaying available video play times, in which a first signal input unit inputs information about a remaining battery capacity and information about a resolution of a video file, a second signal input unit inputs information in a codec-resolution mapping table, and a video play time decision unit acquires available video play times associated with video decoding modes based on the information received from the first signal input unit and the information received from the second signal input unit.

According to an aspect of another exemplary embodiment, there is provided a method for displaying available video play times in which information about a remaining battery capacity of a video playing apparatus and information about a resolution of a video file are received from a first signal input unit, information in a codec-resolution mapping table is received from a second signal input unit, and available video play times associated with video decoding modes are acquired based on the information received from the first signal input unit and the information received from the second signal input unit.

According to an aspect of another exemplary embodiment, there is provided a video playing apparatus for displaying available video play times, in which a storage medium stores information contained in a codec-resolution mapping table, and a video play time decision unit provides a user with available video play times associated with video decoding modes, which are acquired from the codec-resolution mapping table information provided from the storage medium based on a remaining battery capacity information and resolution information of a video file, which are received from an external source, and decodes a video to be played in a video decoding mode selected by the user.

According to an aspect of another exemplary embodiment, there is provided a method for playing a video in a video playing apparatus, in which available video play times associated with video decoding modes are acquired from information in a codec-resolution mapping table provided from a storage medium based on a remaining battery capacity information and resolution information of a video file, which are received from an external source, the acquired available video play times associated with video decoding modes are provided to a user; and a video to be played in a video decoding mode selected by the user is decoded.

BRIEF DESCRIPTION OF THE DRAWINGS

The above and/or other aspects will be more apparent from the following description of exemplary embodiments, taken in conjunction with the accompanying drawings, in which:

FIG. 2 is a diagram illustrating an example of a codec-resolution mapping table according to an exemplary embodiment;

FIG. 3 is a diagram illustrating an example of providing user information according to an exemplary embodiment.

DETAILED DESCRIPTION OF EXEMPLARY EMBODIMENTS

The following description with reference to the accompanying drawings is provided to assist in a comprehensive understanding of exemplary embodiments as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions are omitted for clarity and conciseness.

Exemplary embodiments provide an apparatus and method for displaying available video play times associated with resolutions based on a remaining battery capacity, and the apparatus and method may be implemented in a structure and signal processing procedure for playing videos in an existing portable terminal.

Figure 1:
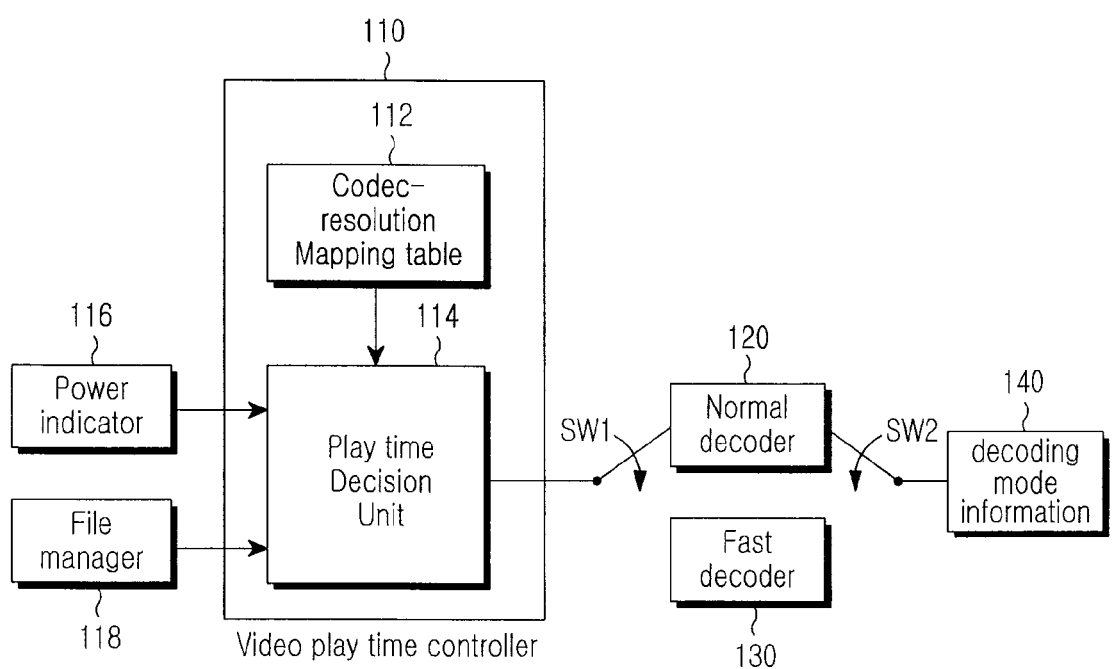
FIG. 1 is a block diagram of an apparatus for displaying available video play times based on a remaining battery capacity according to an exemplary embodiment.

FIG. 1 is a block diagram illustrating a structure of an apparatus for displaying available video play times based on a remaining battery capacity according to an exemplary embodiment.

Referring to FIG. 1, power indicator information provided by a power indicator 116, i.e., a first signal input unit, and file resolution information provided by a file manager 118, i.e., a second signal input unit, are defined as input signals, and decoding mode information 140, which may be provided on a display, is defined as an output signal.

The power indicator information is information indicating a remaining capacity of a battery. The higher the precision of the power indicator 116, the more accurate the available video play times provided by the exemplary embodiments.

The file manager 118 provides a user with a list of files playable in a portable terminal. In accordance with an exemplary embodiment, the file manager 118 may provide a video play time controller 110 with, for example but not limited to, codec profiles, standard video reproduction resolutions (or picture qualities), basic play times and the like of videos selected by the user.

The video play time controller 110 calculates available play times associated with video reproduction resolutions based on a remaining battery capacity with regard to a video that the user selected based on the information received through the power indicator 116 and the file manager 118. The video play time controller 110 provides the calculated available play times associated with video reproduction resolutions so that the user may select a preferred resolution, and activates a decoder based on the user selection.

The video play time controller 110, a device for displaying available play times, includes a codec-resolution mapping table 112 that is based on at least one available video codec and its associated highest supportable resolutions. The codec-resolution mapping table may be stored in a storage medium, which is generally indicated by block 112 of FIG. 1 FIG. 2 shows an example of the codec-resolution mapping table 112.

A play time decision unit 114 included in the video play time controller 110 calculates available play times associated with decoding modes based on the received information. That is, in playing a video selected by the user in different decoding modes, the play time decision unit 114 calculates available play times associated with decoding modes taking the remaining battery capacity into consideration. The play time decision unit 114 presents the results of the available play time calculations so that the user may select one of the calculated available play times. If one of the presented available play times is selected by the user, the play time decision unit 114 delivers the related information to a decoder that supports a decoding mode corresponding to the selected available play time.

A normal decoder 120 and/or a fast decoder 130 may be optionally provided in an exemplary embodiment. If only the normal decoder 120 is provided, the user's choice may be limited. However, if the fast decoder 130 capable of fast decoding is further provided, the user may be offered a greater selection of available play times.

As described above, by displaying available play times of a video according to a remaining battery capacity, exemplary embodiments may prevent the user from stopping viewing the video due to shortage of battery power.

FIG. 2 is a diagram illustrating an example of a codec-resolution mapping table according to an exemplary embodiment. The table may be provided in many different combinations and forms according to performance of the terminal. However, details of the codec-resolution mapping table may include information about play times associated with video reproduction resolutions, which are based on a reference battery capacity. For example, if a portable terminal can play videos of H.264, MPEG-4 and/or DivX format, and its highest available resolution is Video Graphic Array (VGA), the codec-resolution mapping table may be made as shown in FIG. 2.

FIG. 3 is a diagram illustrating an example of information provided to a user according to an exemplary embodiment. In the example of FIG. 3, information is provided to the user based on the codec-resolution mapping table 112 and the information which is input to the play time decision unit 114.

If the user selects a video playing method based on the information shown in FIG. 3, a decoder corresponding to the selected video playing method is designated and enabled. An image size of the video being played is provided as an input signal to the decoder.

Figure 4:
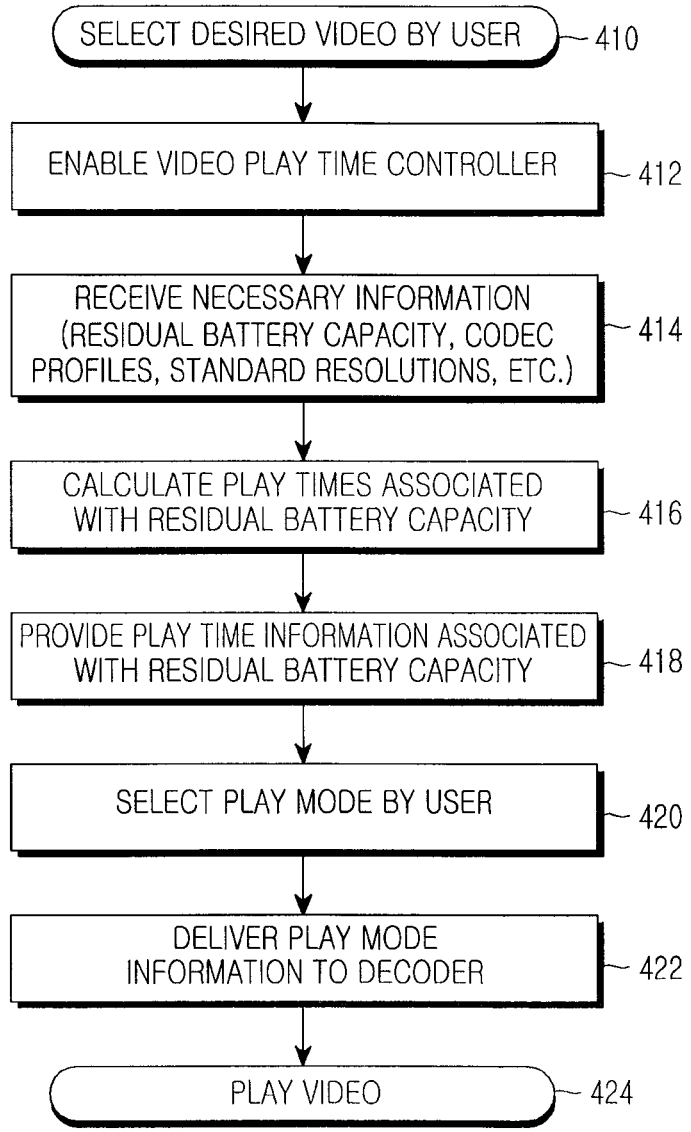
FIG. 4 is a flowchart illustrating a control flow for displaying available video play times based on a remaining battery capacity according to an exemplary embodiment.

FIG. 4 is a flowchart illustrating a control flow for displaying available video play times based on a remaining battery capacity according to an exemplary embodiment.

Referring to FIG. 4, a desired video is selected by a user (410). Upon the selection of the video, a video play time controller 110 is enabled (412).

The video play time controller 110 receives information related to playing the video, including a remaining battery capacity, and codec profiles and standard resolutions of the video selected by the user (414). The video play time controller 110 calculates play times matched to the current remaining battery capacity using the received information based on the codec-resolution mapping table 112 (416).

The video play time controller 110 provides the calculated play times in the form, for example, shown in FIG. 3, so that the user may select one of the play times (418). FIG. 3 shows a variety of combinations that the user can select at the current remaining battery capacity, regarding the selected video. That is, it is assumed in FIG. 3 that a portable terminal has two decoders for each of different compression standards. One of the two decoders is a high-resolution decoder consuming a large amount of battery power and the other one is a low-resolution decoder consuming a small amount of battery power. Therefore, in an exemplary embodiment, two decoders are provided and each decoder performs decoding at two different resolutions of VGA and Quarter VGA (QVGA), providing a total of four available play times. In addition, it is also possible to calculate a larger number of available play times by controlling brightness of a liquid crystal display (LCD).

After reviewing the play time information, the user selects one of the calculated play times to determine a play mode (420). The video play time controller 110 selects a proper decoder from among the decoders (e.g., the normal decoder 120 and the fast decoder 130) based on the user-selected information, and provides information about the play mode to the selected decoder (422). The selected decoder plays the video for the user's desired play time based on the received information (424).

While exemplary embodiments been shown and described, it will be understood by those skilled in the art that various changes in form and details may be made therein without departing from the spirit and scope of the invention as defined by the appended claims and their equivalents.

What is claimed is:

1. An apparatus for displaying available video play times, the apparatus comprising:
   a first signal input unit which provides information about a remaining battery capacity and information about a resolution of a video file;
   a second signal input unit which provides information about video decoding modes associated with resolutions; and
   a video play time controller which acquires available video play times of the video file associated with at least one of the video decoding modes based on the information about the remaining battery capacity and the information about the resolution of the video file provided by the first signal input unit and the information about the video decoding modes associated with the resolutions provided by the second signal input unit.

2. The apparatus of claim 1, wherein the video play time controller comprises a video play time decision unit which calculates the available video play times associated with the resolutions based on the remaining battery capacity, and outputs a video decoding mode corresponding to an available video play time selected from among the calculated available video play times associated with the resolutions.

3. The apparatus of claim 2, further comprising at least one decoder which decodes the video file to be played in the output video decoding mode.

4. A method for displaying available video play times, the method comprising:
   receiving information about a remaining battery capacity of a video playing apparatus and a resolution of a video file;
   receiving information about video decoding modes associated with resolutions; and
   acquiring available video play times of the video file associated with at least one of the video decoding modes based on the information about the remaining battery capacity of the video playing apparatus and the resolution of the video file and the information about the video decoding modes associated with the resolutions.

5. The method of claim 4, wherein the acquiring the available video play times comprises calculating the available video play times associated with the resolutions based on the remaining battery capacity.

6. The method of claim 5, further comprising displaying the calculated available video play times associated with the resolutions.

7. The method of claim 6, further comprising outputting a video decoding mode corresponding to an available video play time selected from among the calculated available video play times associated with the resolutions.

8. The method of claim 7, further comprising decoding a video to be played in the output video decoding mode.

9. An apparatus for displaying available video play times, the apparatus comprising:
   a storage medium which store information about video decoding modes associated with resolutions; and
   a video play time decision unit which provides available video play times of a video file associated with at least one of the video decoding modes, based on a remaining battery capacity information and resolution information of the video file, which are received from an external source, and decodes the video file to be played in a selected video decoding mode.

10. The apparatus of claim 9, further comprising a decoder which decodes the video file to be played in a video decoding mode designated by the video play time decision unit.

11. The apparatus of claim 9, wherein the information about the video decoding modes associated with the resolutions stored in the storage medium is determined by video decoding modes supportable and highest resolutions available in the video playing apparatus.

12. A method for playing a video in a video playing apparatus, the method comprising:
   acquiring available video play times of a video file associated with at least one video decoding mode from information stored in a storage medium about video decoding modes associated with resolutions, based on remaining battery capacity information and resolution information of the video file, which are received from an external source;
   outputting the acquired available video play times of the video file associated with the at least one video decoding mode from among the video decoding modes associated with the resolutions; and
   decoding the video file to be played in a selected video decoding mode.

13. The method of claim 12, wherein the information about the video decoding modes associated with the resolutions stored in the storage medium is determined by video decoding modes supportable and highest resolutions available in the video playing apparatus.

* * * * *